Patented Nov. 22, 1949

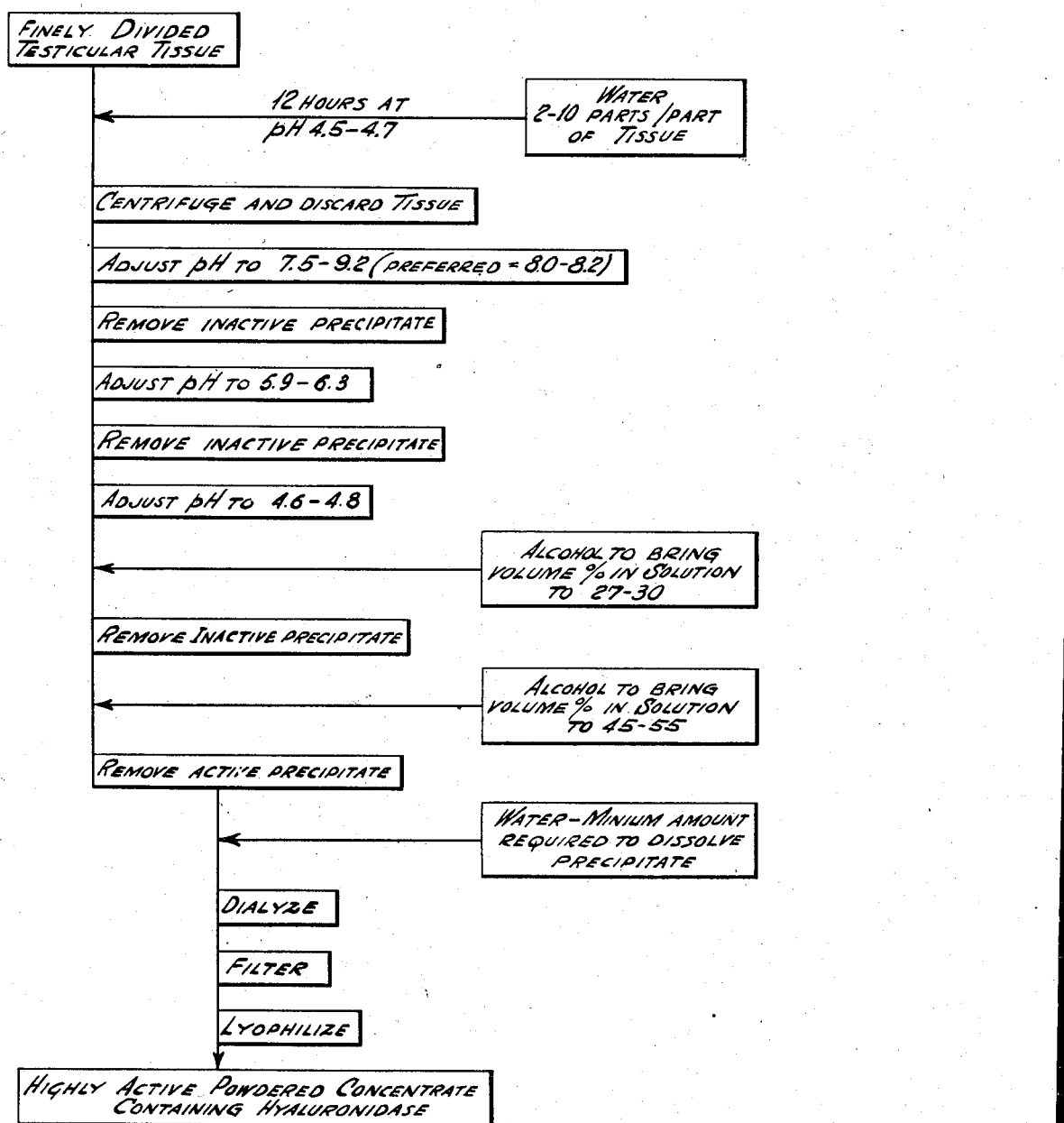

2,488,564

UNITED STATES PATENT OFFICE 2,488,564

PREPARATION OF HYALURONIDASE

Heron O. Singher, Redhook, and Helen Styles, New York, N. Y., assignors to Ortho Pharmaceutical Corporation, a corporation of New Jersey Application June 3, 1947, Serial No. 752,294

6 Claims. (Cl. 195—66)

This invention relates to the isolation and preparation of an enzyme which reduces the viscosity of mucopolysaccharides and more specifically relates to the isolation and preparation of hyaluronidase.

It has been known for a number of years that bacterial enzymes could reduce the viscosity of mucopolysaccharides, and an enzyme has been isolated from pneumococcus which hydrolyzes hyaluronic acid. More recently it has been shown that an enzyme which was capable of reducing the viscosity of synovial fluid could be isolated from mammalian testicular tissue, and it was concluded from this that the tissue contained an enzyme which depolymerized the hyaluronic acid which is present in synovial fluid. It was later demonstrated that purified hyaluronic acid was depolymerized by the action of this testicular enzyme. Various types of decomposition products have been identified including monosaccharides such as glucuronic acid and N-acetyl-glucosamine as well as oligosaccharides of varying molecular weights; however, the decomposition products obtained depended upon the purity of the enzyme.

The testicular enzyme which reduces the viscosity of hyaluronic acid by depolymerization is known as hyaluronidase; it is also known as the "Spreading factor" because of the property it has of enhancing the diffusion in tissues by modifying the permeability of tissue in vivo.

Hyaluronidase has been found in relatively large amounts in mammalian testicular tissue, its most important source; it has also been found in sperm, spleen, and in certain bacteria and poisonous animals.

The theory has been advanced that the function of hyaluronidase in testicular tissue is connected with fertilization, and recent experiments suggest that this enzyme functions to accomplish the dissolution of the intracellular cement connecting the ring of cumulous cells to the ova. The anesthetic effects of Novocain have been found to be enhanced by the addition of hyaluronidase to the Novocain which is injected; furthermore, drugs injected into the peritoneum together with hyaluronidase result in an increased absorption. These results indicate that hyaluronidase has many practical applications in the administration of pharmalogical preparations by injection, since it has been shown that the effects of such preparations are enhanced as a result of increased absorption due to the presence of hyaluronidase.

Mammalian testicular tissue has generally been used as a source of hyaluronidase in laboratory preparations because of its availability and its relatively large content of the enzyme. One method used in the isolation and preparation of hyaluronidase has involved the extraction of finely divided testicular tissue with water, followed by an adjustment of the pH to 4.5 or by an extraction of the said tissue with 0.1 normal acetic acid and a subsequent removal of the tissue, neutralization, and filtration. Another method used consists of water extraction and ammonium sulphate fractionation; inactive material was removed in the fraction precipitated at 27-30 per cent concentration of ammonium sulphate and active material was precipitated at 70 per cent concentration of ammonium sulphate. Lead acetate fractionation of a water extract of testicular tissue has been attempted with unsatisfactory results. Sodium chloride fractionation of the water extract yielded materials of such low activity that this method was unsatisfactory. All the methods of isolation and preparation of hyaluronidase from testicular tissue which have been developed so far have not been commercially feasible because hyaluronidase prepared by these methods was low in activity and the activity varied widely. The preparations produced by the methods of the prior art have contained large amounts of inactive material and variable amounts of insoluble material.

A general object of this invention is to isolate and prepare hyaluronidase from mammalian testicular tissue by a method which results in a product having high activity and containing a minimum of inactive materials.

Another and more specific object of this invention is to prepare hyaluronidase from testicular tissue, at a temperature substantially below normal temperatures, and to purify the crude enzyme by alcohol fractionation.

Other objects will be apparent from the following description and appended claims.

The objects of this invention are accomplished by extracting finely divided mammalian testicular tissue with water and by a subsequent purification and fractionation of the aqueous extract which results in the isolation of a highly active hyaluronidase preparation. The whole process of extraction, purification, and fractionation is performed at a temperature below 5° C.

Testicular tissue is finely divided by freezing testes from which the membranous covering has been removed. The frozen testes are broken into small pieces and ground into a very fine powder and then subjected to further subdivision by means of a Waring blender. The resulting viscous material is diluted with water. Two to ten parts of water may be used for each part of testicular material, but it is preferred to employ five parts of water for each part of tissue. When the dilution is less than two parts of water to one of tissue, complete extraction is not accomplished, and when the dilution is greater than ten parts of water to one of tissue, the amount of enzyme extracted is relatively constant and only diluted by the greater volume of water. The pH of the aqueous solution is adjusted and maintained at 4.5–4.7 during the extraction; if the pH is higher than 4.7, the yield of enzyme is lower, and if the pH is lower than 4.5, there is some destruction of the activity of the enzyme. The extraction is continued over a period of at least 12 hours with constant slow stirring. The residual tissue is removed by any satisfactory means, such as centrifugation, and may then be re-extracted with water and again the pH during the extraction is maintained at 4.5–4.7. The pH of the aqueous extract or the combined aqueous extracts is adjusted to 7.5–9.2, the preferred pH being from 8.0–8.2; the extract is then allowed to stand for several hours, and during this time an inactive precipitate is formed. The precipitate is removed and the pH of the resulting solution is readjusted to 5.9–6.3, and allowed to stand; the resulting precipitate of inactive material is filtered from the solution and the pH of the solution is adjusted to 4.6–4.8. The active enzyme which is in solution is then fractionated from inactive materials in the solution by a first addition of cold ethyl alcohol in an amount to bring the volume per cent of alcohol to 20–30 per cent; it is preferred that the volume per cent of alcohol be 27–30 per cent, although this results in a slight loss of activity by removing a larger amount of inactive material from the solution than could be removed by a lower concentration of alcohol. The cold ethyl alcohol is added slowly to the aqueous extract with constant stirring in order to minimize denaturation of the enzyme. The alcohol solution is allowed to stand for a number of hours and during this period a precipitate of inactive materials is formed and removed. Hyaluronidase is not precipitated to any appreciable extent from a solution in which the volume per cent of alcohol is as low as 30 per cent, but at higher concentrations of alcohol the enzyme is precipitated. The second step of the fractionation procedure consists in bringing the volume per cent of alcohol in the solution to 45–55 per cent. If the volume per cent of alcohol is greater than 55 per cent, inactive protein material and also some non-protein materials are precipitated with the hyaluronidase. The aqueous alcohol solution containing 45–55 volume per cent of alcohol is allowed to stand for a few hours, during which time hyaluronidase is precipitated; this precipitate can be refractionated, and in either case the precipitate is removed and redissolved in a small amount of water. The aqueous solution is dialyzed against running water, filtered, and brought to dryness by any means by which this may be accomplished at low temperatures. Throughout the alcohol fractionation the pH of the solution is maintained within the broad range of 4.6–7.0 and preferably within the range of 4.6–4.8.

The whole procedure is conducted at a temperature below 5° C. and is satisfactorily performed in a cold room which is maintained at a temperature within the range of from 1° to 5° C.

This method results in a minimum amount of denaturation of the enzyme and yields a product having high activity.

The following example is given to illustrate a specific embodiment of the invention, but it is not intended that the scope of the invention be delineated thereby but is to be limited only by the breadth of the appended claims.

*Example I*

The temperature throughout the following procedure was kept at all times within the range of from 1° to 5° C.

620 grams of bull testes were frozen in dry ice. The outer membrane was removed, and the testicular tissue was ground to a powder in the presence of dry ice. The ground material was allowed to stand until the dry ice had evaporated; the residue amounted to 577 grams and was further ground in a Waring blender for about ten minutes. The viscous mixture of ground tissue was added to 2885 cc. of water, and the pH of the mixture was adjusted to 4.61 with normal acetic acid. The solution was stirred slowly overnight and was then centrifuged; the solid material was discarded. Normal sodium hydroxide was added to the clear supernatent liquid until the pH of the solution was 8.72, and this solution was allowed to stand overnight. The precipitate which was formed was removed by centrifugation, and the pH of the solution was adjusted to 6.3 by the addition of two normal acetic acid. This solution was again allowed to stand overnight. This resulted in the formation of another precipitate which was removed by centrifugation. The pH of the solution is adjusted to 4.65 with dilute acetic acid, and 462 cc. of cold redistilled 95 per cent ethyl alcohol was added slowly with stirring to 1 liter of the above solution, and a pink-white precipitate was formed when the alcohol solution was allowed to stand; this precipitate was removed by centrifugation and the supernatant liquid was filtered. 648 cc. of cold redistilled 95 per cent ethyl alcohol was added slowly with stirring to the filtrate, and this solution was allowed to stand in the cold whereupon a precipitate of active material was formed and this precipitate was removed by centrifugation and frozen. All liquid was removed from the frozen material under vacuum. The dry precipitate, weighing 2.2 grams, was dissolved in 10 cc. of cold distilled water and dialyzed against cold water. The dialysate was adjusted to a pH of 5.5 and centrifuged; the supernatant material was dried by lyophilization; this yielded 1.7 grams of dried material.

The dried material was tested for activity according to the procedure of Madinaveitia and Quibell, Biochemical Journal, volume 34, page 625 (1940), and volume 35, page 456 (1941), and 1 mg. was found to contain approximately 20 reducing units. One reducing unit is represented by a preparation of which 1 mg. will reduce the viscosity of hyaluronic acid to one half its initial viscosity in twenty minutes.

What is claimed is:

1. A process for the preparation of hyaluronidase from finely divided testicular tissue, conducted throughout at a temperature below 5° C., which comprises adding water to said tissue, adjusting the pH of the aqueous mixture to within the range of from 4.5–4.7, separating the solid material from the liquid, adjusting the pH of the liquid to within the range of from 7.5–9.2, whereby inactive solid material is precipitated, separating the precipitate from the liquid, adjusting the pH of the liquid to within the range of from 5.9–6.3, whereby inactive solid material is precipitated, separating the precipitate from the liquid, adjusting the pH of the liquid to within the range of from 4.6–7.0, adding ethyl alcohol to the liquid in an amount such that the volume per cent of alcohol is within the range of from 20–30 per cent, whereby inactive solid material is precipitated, separating the solid material from the liquid, adding ethyl alcohol to the liquid in an amount such that the volume per cent of alcohol is within the range of from 45–55 per cent, whereby a precipitate containing hyaluronidase is formed, and separating the precipitate from the liquid.

2. A process for the preparation of hyaluronidase from finely divided testicular tissue, conducted throughout at a temperature below 5° C., which comprises adding water to said tissue, adjusting the pH of the aqueous mixture to within the range of from 4.5–4.7, separating the solid material from the liquid, adjusting the pH of the liquid to within the range of from 7.5–9.2, whereby inactive solid material is precipitated, separating the precipitate from the liquid, adjusting the pH of the liquid to within the range of from 5.9–6.3, whereby inactive solid material is precipitated, separating the precipitate from the liquid, adjusting the pH of the liquid to within the range of from 4.6–7.0, adding ethyl alcohol to the liquid in an amount such that the volume per cent of alcohol is within the range of from 20–30 per cent, whereby inactive solid material is precipitated, separating the solid material from the liquid, adding ethyl alcohol to the liquid in an amount such that the volume per cent of alcohol is within the range of from 45–55 per cent, whereby a precipitate containing hyaluronidase is formed, separating the precipitate from the liquid, dissolving the precipitate in water, and dialyzing the aqueous solution against running water.

3. A process for the preparation of hyaluronidase from finely divided testicular tissue, conducted throughout at a temperature below 5° C., which comprises adding water to said tissue, adjusting the pH of the aqueous mixture to within the range of from 4.5–4.7, separating the solid material from the liquid, adjusting the pH of the liquid to within the range of from 7.5–9.2, whereby inactive solid material is precipitated, separating the precipitate from the liquid, adjusting the pH of the liquid to within the range of from 5.9–6.3, whereby inactive material is precipitated, separating the solid material from the liquid, adjusting the pH of the liquid to within the range of from 4.6–7.0, adding ethyl alcohol to the liquid in an amount such that the volume per cent of alcohol is within the range of from 20–30 per cent, whereby inactive solid material is precipitated, separating the solid material from the liquid, adding ethyl alcohol to the liquid in an amount such that the volume per cent of alcohol is within the range of from 45–55 per cent, whereby a precipitate containing hyaluronidase is formed, separating the precipitate from the liquid, dissolving the precipitate in water, dialyzing the aqueous solution against running water, and filtering.

4. A process for the preparation of hyaluronidase from finely divided testicular tissue, conducted throughout at a temperature below 5° C., which comprises adding water to said tissue, adjusting the pH of the aqueous mixture to within the range of from 4.5–4.7, separating the solid material from the liquid, adjusting the pH of the liquid to within the range of from 7.5–9.2, whereby inactive solid material is precipitated, separating the precipitate from the liquid, adjusting the pH of the liquid to within the range of from 5.9–6.3, whereby inactive solid material is precipitated, separating the precipitate from the liquid, adjusting the pH of the liquid to within the range of from 4.6–7.0, adding ethyl alcohol to the liquid in an amount such that the volume per cent of alcohol is within the range of from 20–30 per cent, whereby inactive solid material is precipitated, separating the solid material from the liquid, adding ethyl alcohol to the liquid in an amount such that the volume per cent of alcohol is within the range of from 45–55 per cent, whereby a precipitate containing hyaluronidase is formed, separating the precipitate from the liquid, dissolving the precipitate in water, dialyzing the aqueous solution against running water, filtering, and evaporating it to dryness.

5. A process for the preparation of hyaluronidase from finely divided testicular tissue, conducted throughout at a temperature below 5° C., which comprises adding water to said tissue, adjusting the pH of the aqueous mixture to 4.6, separating the solid material from the liquid, adjusting the pH of the liquid to within the range of from 8.0–8.2, whereby inactive solid material is precipitated, separating the precipitate from the liquid, adjusting the pH of the liquid to within the range of from 5.9–6.3, whereby inactive solid material is precipitated, separating the precipitate from the liquid, adjusting the pH to within the range of from 4.6–4.8, adding ethyl alcohol to the liquid in an amount such that the volume per cent of the alcohol is within the range of from 27–30 per cent, whereby inactive solid material is precipitated, separating the solid material from the liquid, adding ethyl alcohol to the liquid in an amount such that the volume per cent of alcohol is within the range of from 45–55 per cent, whereby a precipitate containing hyaluronidase is formed, and separating the precipitate from the liquid.

6. A process for the preparation of hyaluronidase from finely divided testicular tissue, conducted throughout at a temperature below 5° C., which comprises adding water to said tissue, adjusting the pH of the aqueous mixture to 4.6, separating the solid material from the liquid, adjusting the pH of the liquid to within the range of from 8.0–8.2, whereby inactive solid material is precipitated, separating the precipitate from the liquid, adjusting the pH of the liquid to within the range of from 5.9–6.3, whereby inactive solid material is precipitated, separating the precipitate from the liquid, adjusting the pH to within the range of from 4.6–4.8, adding ethyl alcohol to the liquid in an amount such that the volume per cent of alcohol is within the range of from 27–30 per cent, whereby inactive solid material is precipitated, separating the solid material from the liquid, adding ethyl alcohol to the liquid in an amount such that the volume per cent of alcohol is within the range of from 45–55 per cent, whereby a precipitate containing hyaluronidase is formed, separating the precipitate from the liquid, dissolving the precipitate in water, dialyzing the aqueous solution against running water, filtering, and evaporating it to dryness.

HERON O. SINGHER.
HELEN STYLES.

REFERENCES CITED

The following references are of record in the file of this patent:

UNITED STATES PATENTS

| Number | Name | Date |
|---|---|---|
| 2,376,848 | Hankinson | May 22, 1945 |

OTHER REFERENCES

Jour. Dairy Science, Apr. 1943, pages 331–332 by Babel et al.

Jour. Biol. Chem., Nov. 1939, pages 127–129 by Maver.

Chem. Abstr. 1940, page 1342 by Chain et al.
Chem. Abstr. 1941, page 2945 by Chain et al.
Chem. Abstr. 1942, page 1463 by Gale et al.
Chem. Abstr. 1944, page 3673 by Thompson.
Jour. Soc. of Chem. Ind. (London), 1932, vol. 51, page 912 by Morgan and McClean.